(12) United States Patent
Calo et al.

(10) Patent No.: US 10,735,525 B2
(45) Date of Patent: Aug. 4, 2020

(54) SYSTEM, METHOD AND COMPUTER PROGRAM PRODUCT FOR NETWORK FUNCTION MODIFICATION

(71) Applicant: International Business Machines Corporation, Armonk, NY (US)

(72) Inventors: Seraphin Calo, Yorktown Heights, NY (US); Douglas Freimuth, Yorktown Heights, NY (US); Thai V. Le, Yorktown Heights, NY (US); Christian Makaya, Yorktown Heights, NY (US); Erich Nahum, Yorktown Heights, NY (US); Maroun Touma, Yorktown Heights, NY (US); Dinesh Verma, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/244,393

(22) Filed: Jan. 10, 2019

(65) Prior Publication Data

US 2019/0149616 A1    May 16, 2019

Related U.S. Application Data

(63) Continuation of application No. 15/283,941, filed on Oct. 3, 2016, now Pat. No. 10,257,283.

(51) Int. Cl.
*H04L 12/707* (2013.01)
*H04L 29/08* (2006.01)
(Continued)

(52) U.S. Cl.
CPC ............ *H04L 67/142* (2013.01); *H04L 45/24* (2013.01); *H04L 45/38* (2013.01); *H04L 47/193* (2013.01); *H04L 67/141* (2013.01); *H04L 67/28* (2013.01)

(58) Field of Classification Search
CPC ....... H04L 45/24; H04L 45/38; H04L 47/193; H04L 67/141; H04L 67/142; H04L 67/28;
(Continued)

(56) References Cited

U.S. PATENT DOCUMENTS

2014/0362765 A1* 12/2014 Biswas .................. H04L 45/24
                                                              370/328
2016/0286410 A1*  9/2016 O'Malley .............. G06Q 30/06
(Continued)

OTHER PUBLICATIONS

United States Notice of Allowance dated Nov. 27, 2018, in U.S. Appl. No. 15/283,941.
(Continued)

*Primary Examiner* — Le H Luu
(74) *Attorney, Agent, or Firm* — Kevin Michael Jordan, Esq.; McGinn IP Law Group, PLLC

(57) ABSTRACT

A network function modification method, system, and computer program product, include terminating the connection-oriented session between a client and a server via at least two proxies, running a multipath connection-oriented session between the at least two proxies, if an insertion request is received, establishing a first multipath subflow with the new multipath subflow traversing the network function of the insertion request, and if a removal request is received, establishing a second multipath subflow with the new multipath subflow not traversing the network function of the removal request.

20 Claims, 6 Drawing Sheets

(51) Int. Cl.
*H04L 12/801* (2013.01)
*H04L 12/721* (2013.01)

(58) Field of Classification Search
CPC ............. H04L 12/4633; H04L 43/0864; H04L 65/1069; H04L 69/14; G06F 9/4806; G06Q 30/06; H04W 76/16
See application file for complete search history.

(56) References Cited

U.S. PATENT DOCUMENTS

| | | | |
|---|---|---|---|
| 2016/0309534 A1* | 10/2016 | Teyeb | H04L 69/14 |
| 2016/0315976 A1* | 10/2016 | Detal | H04L 65/1069 |
| 2017/0054631 A1* | 2/2017 | Horn | H04L 67/42 |
| 2017/0118787 A1* | 4/2017 | Kekki | H04W 76/16 |
| 2017/0134261 A1* | 5/2017 | Seo | H04L 67/28 |
| 2017/0188407 A1* | 6/2017 | Zee | H04L 69/14 |
| 2017/0339600 A1* | 11/2017 | Roeland | G06F 9/4806 |
| 2017/0346762 A1* | 11/2017 | Lapidous | H04L 43/0864 |
| 2018/0077267 A1* | 3/2018 | Bayer | H04L 12/4633 |
| 2018/0109473 A1* | 4/2018 | Boucadair | H04L 45/24 |

OTHER PUBLICATIONS

United States Office Action dated Sep. 18, 2018, in U.S. Appl. No. 15/283,941.
Mel, et al. "The NIST Definition of Cloud Computing". Recommendations of the National Institute of Standards and Technology. Nov. 16, 2015.

\* cited by examiner

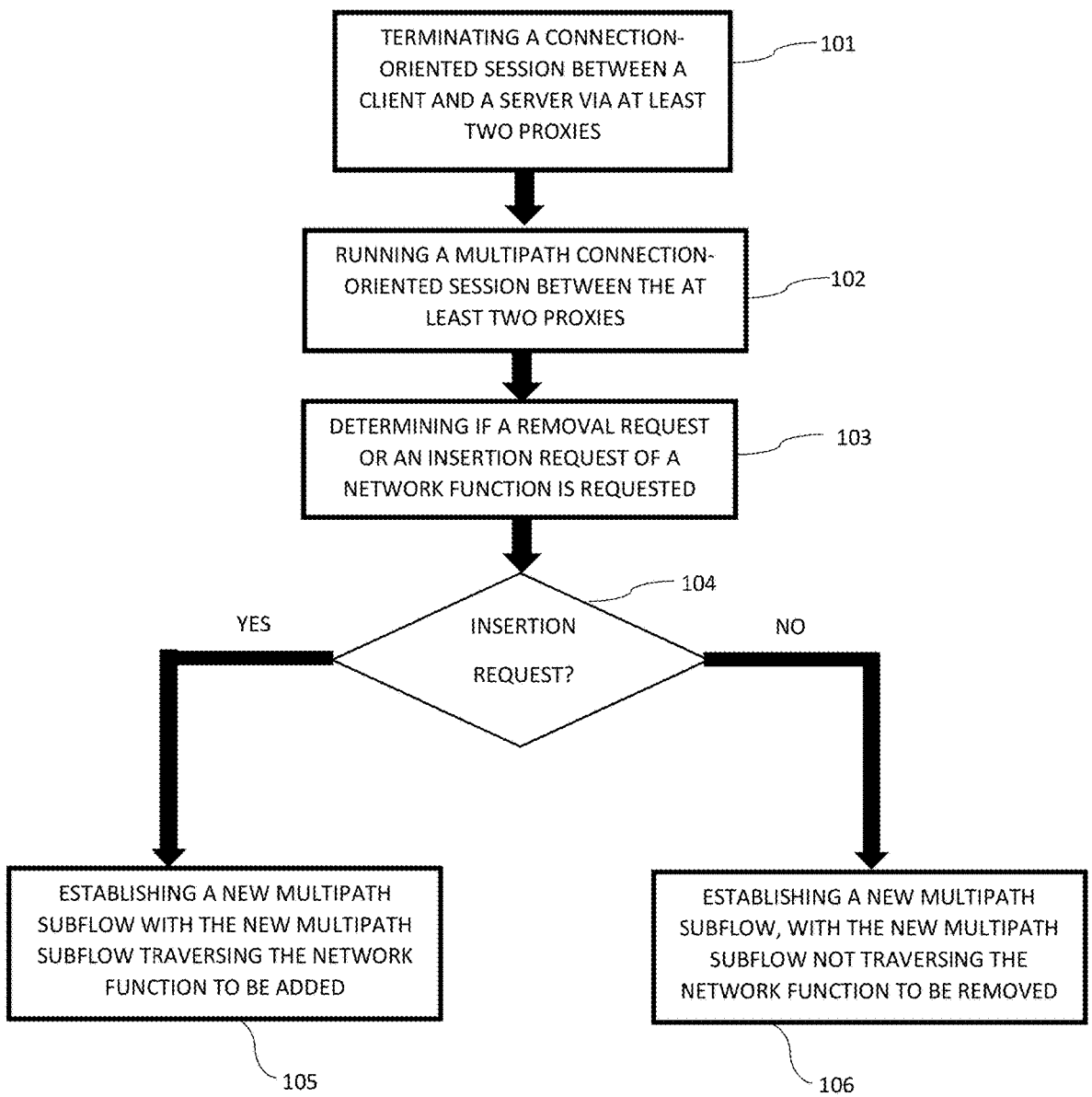

SYSTEM, METHOD AND COMPUTER PROGRAM PRODUCT FOR NETWORK FUNCTION MODIFICATION

CROSS-REFERENCE TO RELATED APPLICATIONS

The present application is a Continuation Application of U.S. patent application Ser. No. 15/283,941, filed on Oct. 3, 2016, the entire contents of which are hereby incorporated by reference.

BACKGROUND

The present invention relates generally to a network function modification method, and more particularly, but not by way of limitation, to a system, method, and computer program product for a network function to gracefully enter and exit a Transmission Control Protocol (TCP) connection when needed.

Virtualized Network Functions (VNF) may be commonly deployed in enterprise, telecommunications, and cloud environments for security (e.g., intrusion detection systems, deep packet inspection scrubber, etc.) and performance reasons (e.g., Split TCP, Wide Area Network (WAN) Optimizer or traffic shaper, etc.). During a TCP connection, there are instances where a network function is dynamically added or removed from a path between the user and the end server. For example, during the retrieval of a large file (e.g., a video), the user may move or the conditions of the network may change in such a way that the presence of the network function can instead slow down the connection. In such cases, leaving the network function in the path would consume processing resources of the network function that might be used to serve other users that can benefit from the network function (e.g., users in areas with poor coverage). Similarly, a connection could be migrated into the network function to improve the connection.

Thus, there is a need in the art to add or to remove a network function from the path of connection for some client-server sessions while the sessions are still in progress.

However, adding or removing network functions is not feasible in the conventional techniques for network functions that terminate the TCP connection to process the stream of data (e.g., WAN optimizer, Split TCP, etc.). Because those network functions terminate the TCP connection, there would typically be two resulting independent TCP connections (i.e., with their own sequence numbers).

That is, in the conventional techniques, if a network function is removed and stops processing the packets from the client but instead the network function forwards them to the server, the sequence number (or port number) will not match the sequence number (or port number) that is expected by the server. As a result, the TCP connection will stall. Similarly, if a connection is added to the network function in the middle of a transfer, a standard TCP stack on the network function would not recognize the network function and terminate the connection.

SUMMARY

In an exemplary embodiment, the present invention can provide a computer-implemented method modifying a network function in a connection-oriented session, the method including terminating the connection-oriented session between a client and a server via at least two proxies and running a multipath connection-oriented session between the at least two proxies, where the modifying comprises inserting the network function in the connection-oriented session and where, if an insertion request is received, establishing a first multipath subflow with the new multipath subflow traversing the network function of the insertion request.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 1 exemplarily shows a high-level flow chart for a network function modification method 100;

DETAILED DESCRIPTION

Figure 2A:
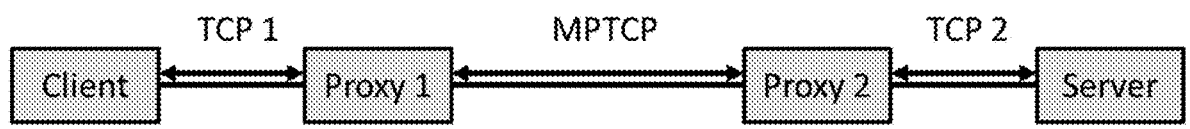
FIGS. 2A-2C exemplarily show an insertion of a network function into a TCP (MPTCP) connection.

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the network function modification method 100 includes various steps to enter and exit a TCP connection with a network function. As shown in at least FIG. 4, one or more computers of a computer system 12 according to an embodiment of the present invention can include a memory 28 having instructions stored in a storage system to perform the steps of FIG. 1.

Thus, the network function modification method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 4-6) may be implemented in a cloud environment 50 (see e.g., FIG. 5), it is nonetheless understood that the present invention can be implemented outside of the cloud environment.

In step 101, a connection-oriented session (e.g., TCP) between a client and a server (e.g., a server and a client, a client and a client, etc.) is terminated via at least two proxies.

In step 102, a multipath connection-oriented session (e.g., MPTCP) is run between the at least two proxies. Such an inventive technique uses multiple paths to enhance connectivity. That is, one of the proxy establishes a new MPTCP subflow with the other proxy, with the new TCP SYN JOIN not traversing the network function to be removed.

In step 103, it is determined if a removal request or an insertion request of a network function is requested by the system. If it is determined that an insertion request is requested (e.g., "YES" in step 104), the flow proceeds to step 105. If it is determined that a removal request is requested (e.g., "NO" in step 104), the flow proceeds to step 106.

In step 105, a new multipath subflow is enabled with the new multipath subflow traversing the network function to be added. The network function copies the necessary multipath information (e.g., MPTCP token) received in the multipath (e.g., MPTCP JOIN) request from a proxy of the at least two proxies into the multipath (e.g., MPTCP JOIN) request to an other proxy of the at least two proxies to successfully establish a multipath (e.g., MPTCP) subflow across the network function. The at least two proxies activate a redirection of traffic into the new multipath (e.g., MPTCP) subflow and stops forwarding traffic on the previous multipath (e.g., MPTCP) subflow(s) in order to insert the network function.

In step 106, a new multipath subflow is established with the new multipath subflow not traversing the network function to be removed. The at least two proxies delaying removal of the network function until all packets from the network function have been successfully received by the destination proxy, and then have the at least two proxies activate redirection of traffic into the new multipath (e.g., MPTCP) subflow and stops forwarding traffic on the previous multipath (e.g., MPTCP) subflow(s).

It is noted that data may still be in the buffer of the network function. To ensure that the at least two proxies have consistent views before stopping to use the network function, the network function ensures that it successfully delivers all its buffered data to the destination. When the buffer in the network function is empty, then the network function can signal the proxies to stop using this MPTCP subflow.

Figure 2B:
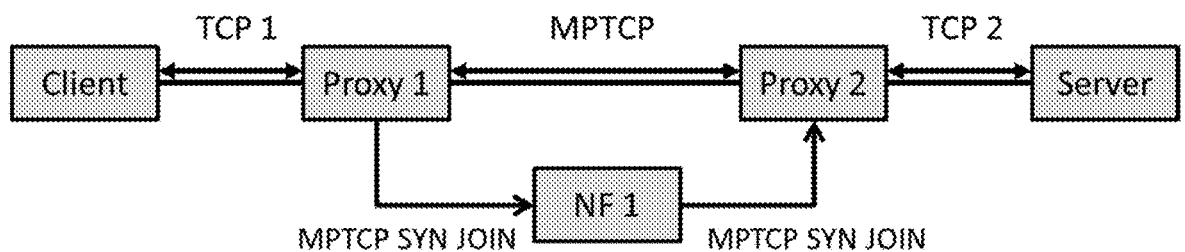
Figure 2C:
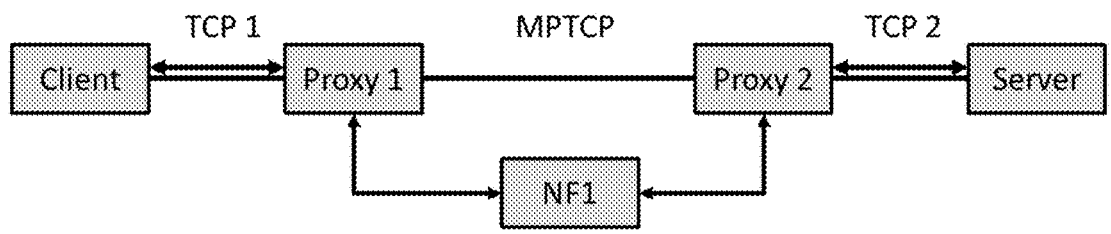

FIGS. 2A-2C exemplarily depict a process of an insertion request of a network function. In FIG. 2A, PROXY 1 and PROXY 2 terminate the TCP connection between a client and a server and run an MPTCP connection. The proxies may be a gateway, a firewall, etc. In FIG. 2B, to introduce a network function (NF1), a new MPTCP subflow is created using a 'MPTCP SYN JOIN' command between PROXY 1 and PROXY 2. Thus, MPTCP SYN JOIN command is used to create a sub-connection. In FIG. 2C, the previous MPTCP subflow (e.g., in FIG. 2B) is terminated such that the traffic is not forwarded on the previous MPTCP subflow directly between PROXY 1 and PROXY 2. For purposes of the present invention, "termination" may be defined as the connection is no longer used (i.e., data packets are no longer sent on that connection), and the connection is closed. Instead, the traffic is forward from PROXY 1 to PROXY 2 via NF1.

That is, to introduce a network function onto an existing TCP connection, the at least two proxies can establish a new MPTCP subflow that traverse the desired network function. After the new MPTCP subflow has been successfully established, the two proxies can stop using the previous MPTCP subflow and instead send traffic over the newly established MPTCP subflow. The MPTCP options (e.g., sequence number, port number, etc.), and mechanisms, ensure that the flow continues on the newly established path uninterrupted and such that no packets are dropped. Such an operation above is transparent to a client and a server.

Figure 3A:
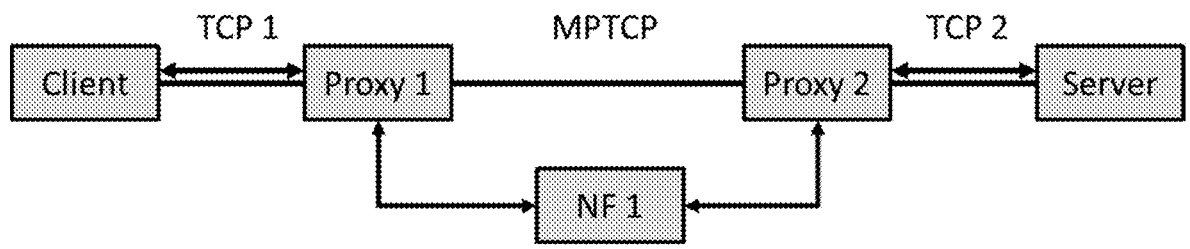
FIGS. 3A-3C exemplarily show a removal of a network function from a TCP (MPTCP) connection.
Figure 3B:
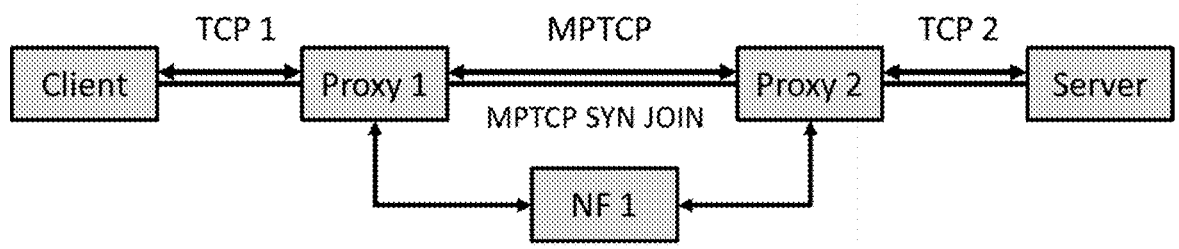
Figure 3C:
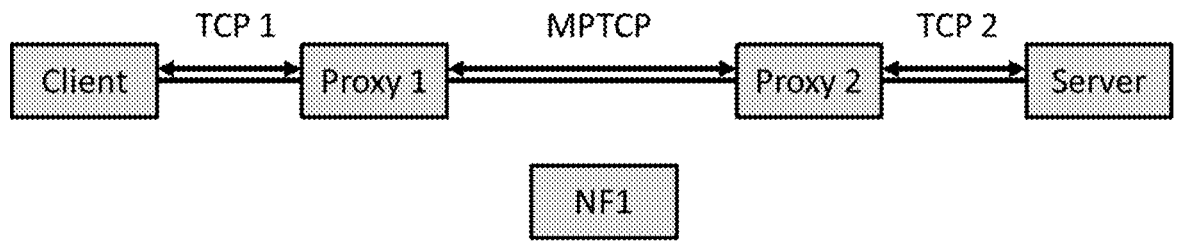

FIGS. 3A-3C exemplarily depict a process of a removal request of a network function (NF). In FIG. 3A, a network function (NF1) is currently running in the network connection. In FIG. 3B, a new MPTCP subflow is created using a 'MPTCP SYN JOIN' command to add the MPTCP subflow between PROXY 1 and PROXY 2. In FIG. 3C, the previous MPTCP subflow between PROXY 1 to NF1 and PROXY 2 to NF is terminated to remove the network function.

That is, to remove a network function from an existing TCP connection, the at least two proxies can establish a new MPTCP subflow that does not traverse the network function to be removed. After the new MPTCP subflow has been successfully established, the two proxies can stop using the previous MPTCP subflow and instead send traffic over the newly established MPTCP subflow. The MPTCP options (e.g., sequence number, port number etc.), and mechanisms, ensure that the flow continues on the newly established path uninterrupted and no packets are dropped. That is, the network function is released.

In some embodiments, a pair of proxies (at least two) can terminate the TCP connection between the two end points, and the proxies run MPTCP, in order to allow a network function to exit an on going TCP connection without disruption.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
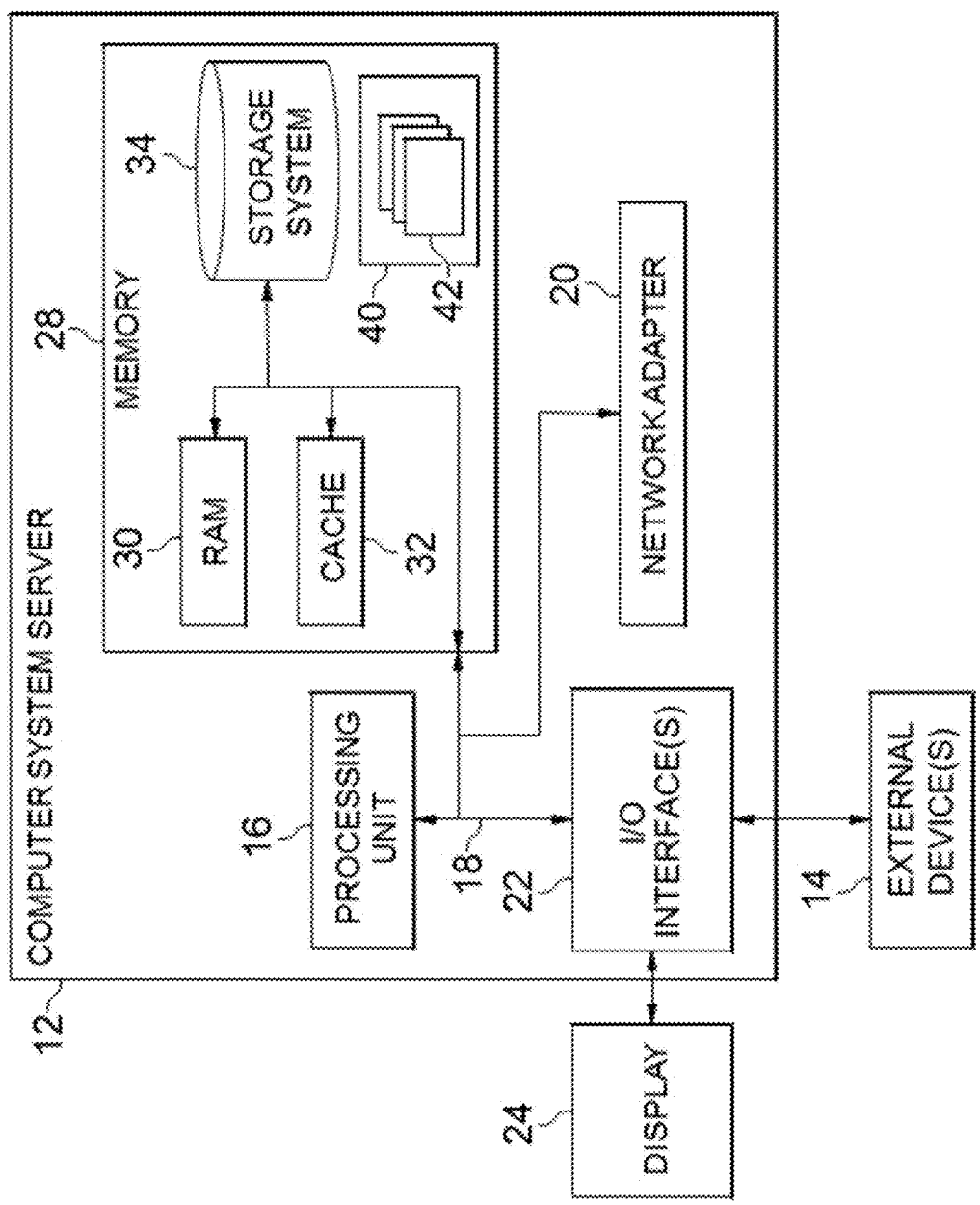
FIG. 4 depicts a cloud computing node 10 according to an embodiment of the present invention.

Referring now to FIG. 4, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 4, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system server 12. Examples, include, but are not limited to: microcode, circuit drivers, redundant processing units, external disk drive arrays, RAID systems, tape drives, and data archival storage systems, etc.

Figure 5:
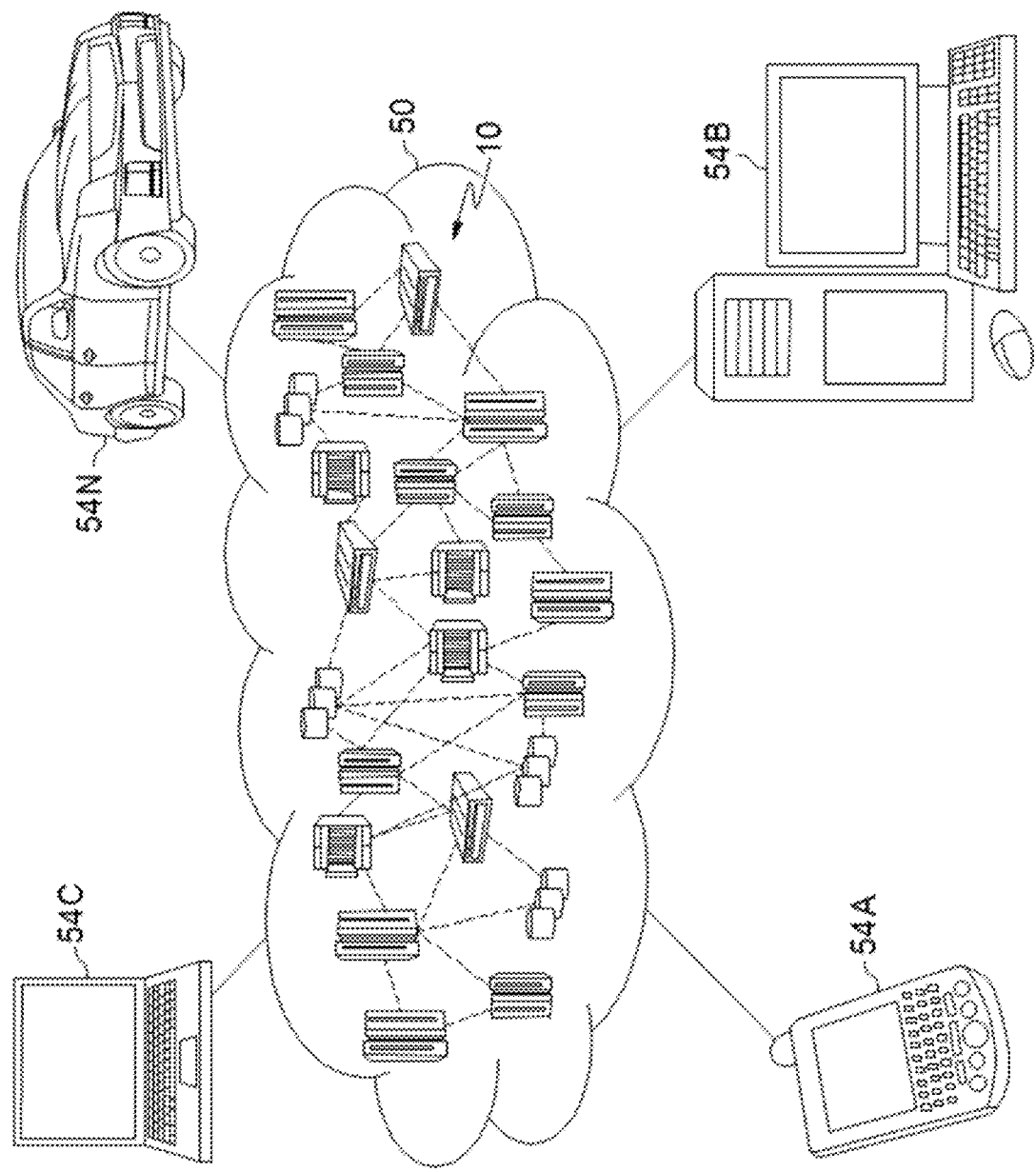
FIG. 5 depicts a cloud computing environment 50 according to an embodiment of the present invention.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
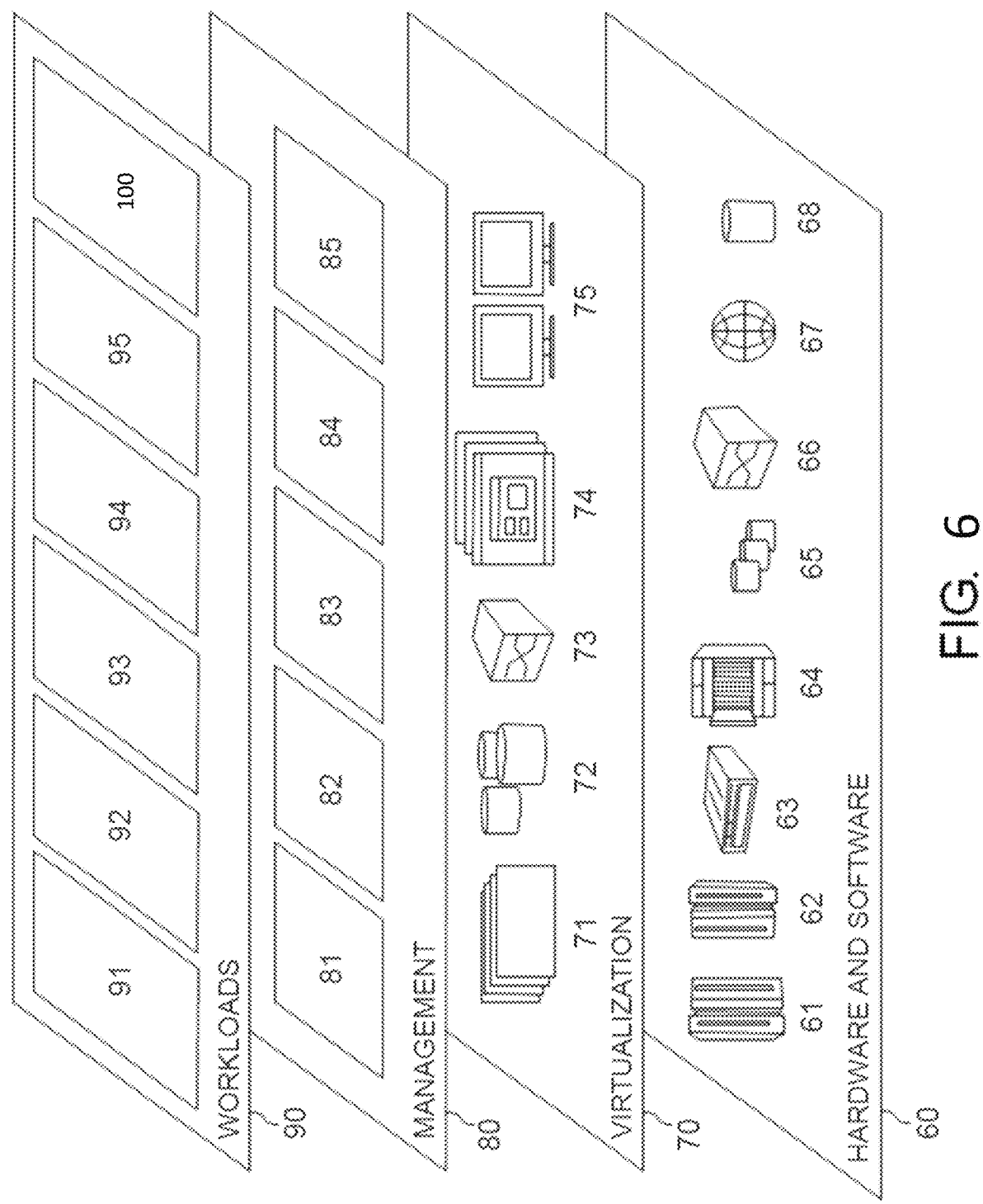
FIG. 6 depicts abstraction model layers according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the network function modification method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method modifying a network function in a connection-oriented session, the method comprising:
   terminating the connection-oriented session between a client and a server via at least two proxies; and
   running a multipath connection-oriented session between the at least two proxies; and
   establishing, via the at least two proxies, a new multipath subflow with the new multipath subflow traversing a network function to be added.

2. The computer-implemented of claim 1, wherein the modifying comprises inserting the network function in the connection-oriented session,
   wherein, if an insertion request is received, establishing a first multipath subflow with the new multipath subflow traversing the network function of the insertion request
   wherein the modifying comprises removing the network function from the connection-oriented session, and
   wherein, if a removal request is received, establishing a second multipath subflow with the new multipath subflow not traversing the network function of the removal request.

3. The computer-implemented method of claim 2, wherein, if the insertion request is received, multipath information received in the multipath request of the network function is copied from a first proxy of the at least two proxies into the multipath request to a second proxy of the at least two proxies to successfully establish the first multipath subflow across the network function, and
   wherein the at least two proxies activate redirection of traffic into the first new multipath subflow and stop forwarding traffic on the multipath connection-oriented session between the at least two proxies.

4. The computer-implemented method of claim 2, wherein, if the removal request is received, the at least two proxies delay removal of the network function until all packets from the network function have been successfully received by a destination proxy of the at least two proxies.

5. The computer-implemented method of claim 4, wherein the at least two proxies activate redirection of traffic into the second new multipath subflow and stop forwarding traffic on the multipath connection-oriented session between the at least two proxies.

6. The computer-implemented method of claim 2, wherein, in both the inserting and the removing, the multipath connection-oriented session between the at least two proxies is terminated once the insertion and the removal are complete.

7. The computer-implemented method of claim 1, embodied in a cloud-computing environment.

8. A computer program product modifying a network function in a connection-oriented session, the computer program product comprising a non-transitory computer-readable storage medium having program instructions embodied therewith, the program instructions executable by a computer to cause the computer to perform:
   terminating the connection-oriented session between a client and a server via at least two proxies; and
   running a multipath connection-oriented session between the at least two proxies; and
   establishing, via the at least two proxies, a new multipath subflow with the new multipath subflow traversing a network function to be added.

9. The computer program product of claim 8, wherein the modifying comprises inserting the network function in the connection-oriented session,
   wherein, if an insertion request is received, establishing a first multipath subflow with the new multipath subflow traversing the network function of the insertion request
   wherein the modifying comprises removing the network function from the connection-oriented session, and
   wherein, if a removal request is received, establishing a second multipath subflow with the new multipath subflow not traversing the network function of the removal request.

10. The computer program product of claim 9, wherein, if the insertion request is received, multipath information received in the multipath request of the network function is copied from a first proxy of the at least two proxies into the multipath request to a second proxy of the at least two proxies to successfully establish the first multipath subflow across the network function, and
    wherein the at least two proxies activate redirection of traffic into the first new multipath subflow and stop forwarding traffic on the multipath connection-oriented session between the at least two proxies.

11. The computer program product of claim 9, wherein, if the removal request is received, the at least two proxies delay removal of the network function until all packets from the network function have been successfully received by a destination proxy of the at least two proxies.

12. The computer program product of claim 11, wherein the at least two proxies activate redirection of traffic into the second new multipath subflow and stop forwarding traffic on the multipath connection-oriented session between the at least two proxies.

13. The computer program product of claim 9, wherein, in both the inserting and the removing, the multipath connection-oriented session between the at least two proxies is terminated once the insertion and the removal are complete.

14. A system modifying a network function in a connection-oriented session, said system comprising:
    a processor; and
    a memory, the memory storing instructions to cause the processor to perform:
      terminating the connection-oriented session between a client and a server via at least two proxies; and
      running a multipath connection-oriented session between the at least two proxies; and
      establishing, via the at least two proxies, a new multipath subflow with the new multipath subflow traversing a network function to be added.

15. The system of claim 14, wherein the modifying comprises inserting the network function in the connection-oriented session,
    wherein, if an insertion request is received, establishing a first multipath subflow with the new multipath subflow traversing the network function of the insertion request
    wherein the modifying comprises removing the network function from the connection-oriented session, and
    wherein, if a removal request is received, establishing a second multipath subflow with the new multipath subflow not traversing the network function of the removal request.

16. The system of claim 15, wherein, if the insertion request is received, multipath information received in the multipath request of the network function is copied from a first proxy of the at least two proxies into the multipath request to a second proxy of the at least two proxies to successfully establish the first multipath subflow across the network function, and
    wherein the at least two proxies activate redirection of traffic into the first new multipath subflow and stop forwarding traffic on the multipath connection-oriented session between the at least two proxies.

17. The system of claim 15, wherein, if the removal request is received, the at least two proxies delay removal of the network function until all packets from the network function have been successfully received by a destination proxy of the at least two proxies.

18. The system of claim 17, wherein the at least two proxies activate redirection of traffic into the second new multipath subflow and stop forwarding traffic on the multipath connection-oriented session between the at least two proxies.

19. The system of claim 15, wherein, in both the inserting and the removing, the multipath connection-oriented session between the at least two proxies is terminated once the insertion and the removal are complete.

20. The system of claim 14, embodied in a cloud-computing environment.

\* \* \* \* \*